(12) United States Patent
Jayaram et al.

(10) Patent No.: US 10,348,731 B2
(45) Date of Patent: Jul. 9, 2019

(54) TECHNIQUES FOR GROUP MESSAGE THREAD LINK ADMINISTRATION

(71) Applicant: Facebook, Inc., Menlo Park, CA (US)

(72) Inventors: Vinodh Jayaram, Fremont, CA (US); Andrew Cairns Moxon, San Francisco, CA (US); Andrew Yaoshu Song, San Francisco, CA (US); Huan Yan Wang, Belmont, CA (US); Viswanath Poosala, Cupertino, CA (US)

(73) Assignee: FACEBOOK, INC., Menlo Park, CA (US)

( * ) Notice: Subject to any disclaimer, the term of this patent is extended or adjusted under 35 U.S.C. 154(b) by 277 days.

(21) Appl. No.: 15/389,998

(22) Filed: Dec. 23, 2016

(65) Prior Publication Data
US 2018/0183619 A1 Jun. 28, 2018

(51) Int. Cl.
| | | |
|---|---|---|
| *H04L 12/18* | (2006.01) | |
| *H04L 29/06* | (2006.01) | |
| *H04L 12/58* | (2006.01) | |
| *H04L 29/08* | (2006.01) | |
| *H04W 4/12* | (2009.01) | |
| *H04W 12/02* | (2009.01) | |
| *H04W 12/08* | (2009.01) | |

(52) U.S. Cl.
CPC ............ *H04L 63/10* (2013.01); *H04L 51/16* (2013.01); *H04L 67/146* (2013.01); *H04W 4/12* (2013.01); *H04W 12/02* (2013.01); *H04L 51/32* (2013.01); *H04L 63/0442* (2013.01); *H04W 12/08* (2013.01)

(58) Field of Classification Search
CPC ..... H04L 12/1822; H04L 51/32; H04L 63/10; H04L 67/146; H04L 67/306; H04L 51/16
See application file for complete search history.

(56) References Cited

U.S. PATENT DOCUMENTS

| | | |
|---|---|---|
| 9,715,494 B1 | 7/2017 | Budinsky et al. |
| 10,021,059 B1* | 7/2018 | Rao .................. H04L 51/32 |
| 10,104,025 B2 | 10/2018 | Beust |
| 2006/0184997 A1* | 8/2006 | La Rotonda ........... G06Q 10/10 726/2 |
| 2007/0171046 A1 | 7/2007 | Diem |
| 2008/0195741 A1 | 8/2008 | Wynn et al. |
| 2012/0185358 A1 | 7/2012 | Ajjarapu et al. |
| 2012/0189272 A1 | 7/2012 | Kunigita et al. |
| 2013/0110946 A1 | 5/2013 | Bradshaw |
| 2016/0093176 A1 | 3/2016 | Sharma et al. |

(Continued)

*Primary Examiner* — Kim T Nguyen

(57) ABSTRACT

Techniques for group message thread link administration are described. In one embodiment, an apparatus may comprise a client front-end component operative to receive a join invitation command associated with a group message thread from an administrator client device, the group message thread associated with a message thread identifier, the message thread identifier identifying the group message thread on a messaging system; and send a join invitation link to the administrator client device; and a group management component operative to generate a join invitation link in response to the join invitation command, the join invitation link comprising a thread invitation identifier, wherein the thread invitation identifier is a hash of the message thread identifier. Other embodiments are described and claimed.

20 Claims, 15 Drawing Sheets

(56) References Cited

U.S. PATENT DOCUMENTS

2016/0096110 A1* 4/2016 Decoufle ............... A63F 13/35
                                                463/29
2016/0127301 A1   5/2016 Jeoung
2016/0349965 A1  12/2016 Griffin et al.

* cited by examiner

*700*

```
Receive a join invitation command associated with a group
message thread from an administrator client device, the group
message thread associated with a message thread identifier,
the message thread identifier identifying the group message
thread on a messaging system.
702
```

```
Generate a join invitation link in response to the join
invitation command, the join invitation link comprising a
thread invitation identifier, wherein the thread invitation
identifier is a hash of the message thread identifier.
704
```

```
Send the join invitation link to the administrator client device.
706
```

Receive a join invitation link at a messaging client on a client device, the join invitation link comprising a thread invitation identifier, the thread invitation identifier identifying a group message thread on a messaging system.
752

Receive a group join command at the messaging client.
754

Add a user account to the group message thread with the messaging system in response to receiving the group join command by identifying the group message thread to the messaging system using the thread invitation identifier.
756

*FIG. 7B*

TECHNIQUES FOR GROUP MESSAGE THREAD LINK ADMINISTRATION

RELATED APPLICATIONS

This application is related to the United States Patent Application titled "Techniques for Group Message Thread Link Joining," 15/389,958, filed on Dec. 23, 2016, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for group message thread link administration and joining. In one embodiment, for example, an apparatus may comprise a client front-end component operative to receive a join invitation command associated with a group message thread from an administrator client device, the group message thread associated with a message thread identifier, the message thread identifier identifying the group message thread on a messaging system; and send a join invitation link to the administrator client device; and a group management component operative to generate a join invitation link in response to the join invitation command, the join invitation link comprising a thread invitation identifier, wherein the thread invitation identifier is a hash of the message thread identifier.

In another embodiment, for example, an apparatus may comprise a user interface component operative to receive a join invitation link at a messaging client on the client device, the join invitation link comprising a thread invitation identifier, the thread invitation identifier identifying a group message thread on a messaging system; and receive a group join command at the messaging client; and a client messaging component operative on the processor circuit to add a user account to the group message thread with the messaging system in response to receiving the group join command by identifying the group message thread to the messaging system using the thread invitation identifier.

Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7A illustrates an embodiment of a first logic flow for the system of FIG. 1.

FIG. 7B illustrates an embodiment of a second logic flow for the system of FIG. 1.

DETAILED DESCRIPTION

Figure 1:
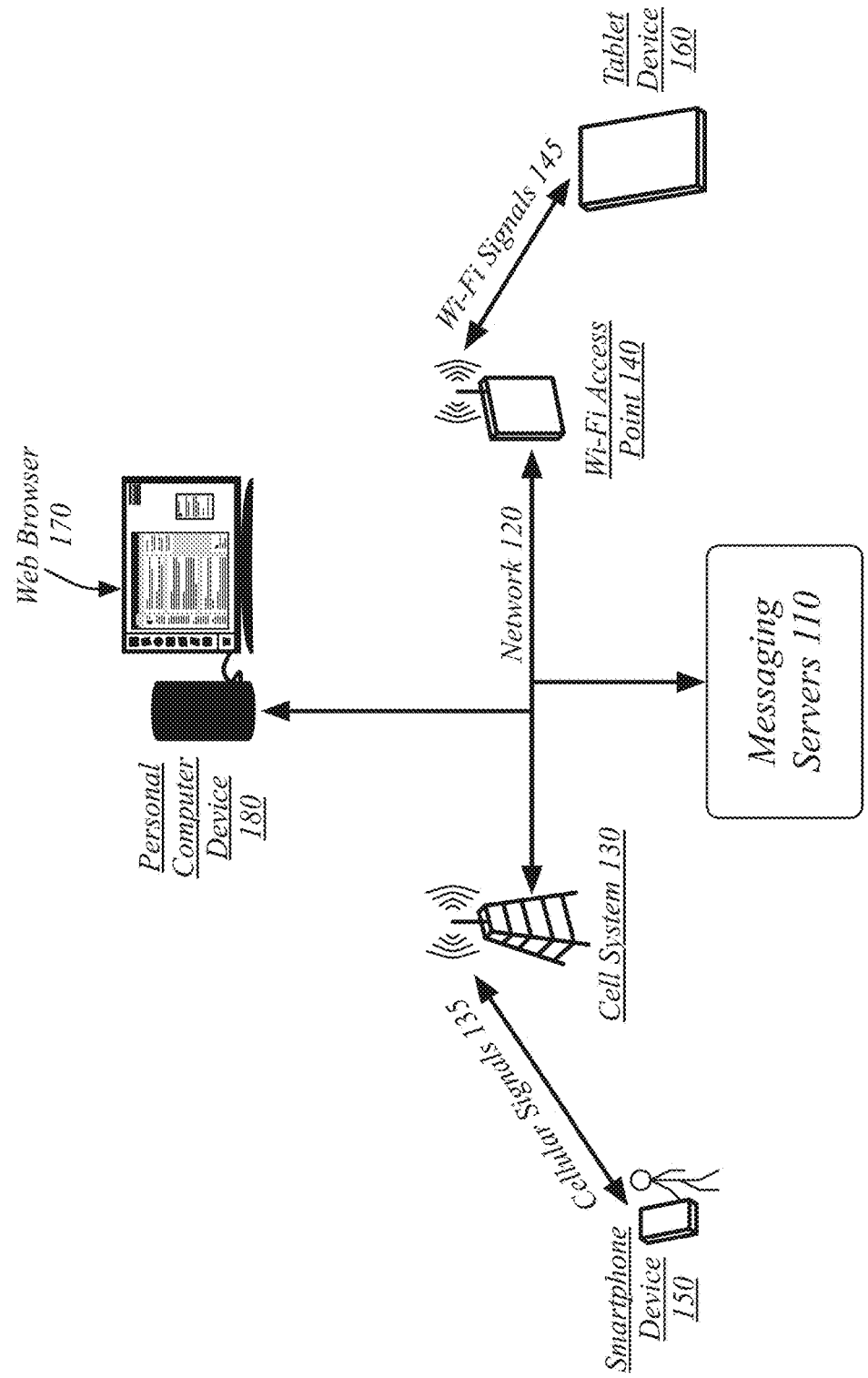
FIG. 1 illustrates an embodiment of a messaging thread link system.

A messaging system may support group message threads, in which a number of users engage in a messaging interaction. In particular, a group message thread may include more than just the two users of a user-to-user individual message thread. Of course, some group threads may contain two users, particularly if its membership starts small, but may then grow into including a larger number of participants.

In some cases, a group message thread may be kept private, such that only users specifically invite to the group message thread are allowed to participate in the group message thread. The messaging system may support a user interface in which users of the messaging system may be selected and thereby invited to participate in the group thread. This may be beneficial for group message threads between groups of friends, coworkers, or other personal or professional relations in which the organization of the group is based upon relationships between the participants. A private group message thread may be only joined, viewed, or contributed to by people specifically invited.

However, in other cases, a group message thread may be made public to at least some degree. A public group message thread may be available for public joining, viewing, and/or contribution. Where this is the case, it may be inconvenient to individually select each user invited to the thread. Instead, a more open invitation may be made in which a link is distributed that empowers a user to join or request to join the group message thread. Such a link may comprise a uniform resource locator (URL) that uniquely identifies a particular group message thread to a messaging system. The link may be distributed through any channel supporting the distribution of links: email, the text of a message, a web page, or any other channel. Further, the link may be embedded in formats that support access to links, such as web controls, application controls, machine-readable optical codes, or any other form of link embedding. As a result, access to a group message thread may be made more open and more convenient.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a messaging thread link system 100. In one embodiment, the messaging thread link system 100 may comprise a computer-implemented system having software applications comprising one or more components. Although the messaging thread link system 100 shown in FIG. 1 has a limited number of elements in a certain topology, it may be appreciated that the messaging thread link system 100 may include more or less elements in alternate topologies as desired for a given implementation.

Messaging servers 110 may comprise one or more messaging servers operated by a messaging platform as part of a messaging system. A messaging server may comprise an Internet-accessible server, with the network 120 connecting the various devices of the messaging system comprising, at least in part, the Internet. A messaging system may use the messaging servers 110 to support messaging for various user client devices.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

A client device may communicate with other devices using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein, including the interoperation of the messaging client and messaging servers through network communication. For example, the messaging client transmitting or receiving messages to or from a server may be interpreted as using the network interface controller for network access to a communications network for the transmission or reception of information.

The messaging system may use knowledge generated from interactions in between users. The messaging system may comprise a component of a social-networking system and may use knowledge generated from the broader interactions of the social-networking system. As such, to protect the privacy of the users of the messaging system and the larger social-networking system, messaging system may include an authorization server (or other suitable component(s)) that allows users to opt in to or opt out of having their actions logged by the messaging system or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system and other elements of a social-networking system through blocking, data hashing, anonymization, or other suitable techniques as appropriate.

Figure 2:
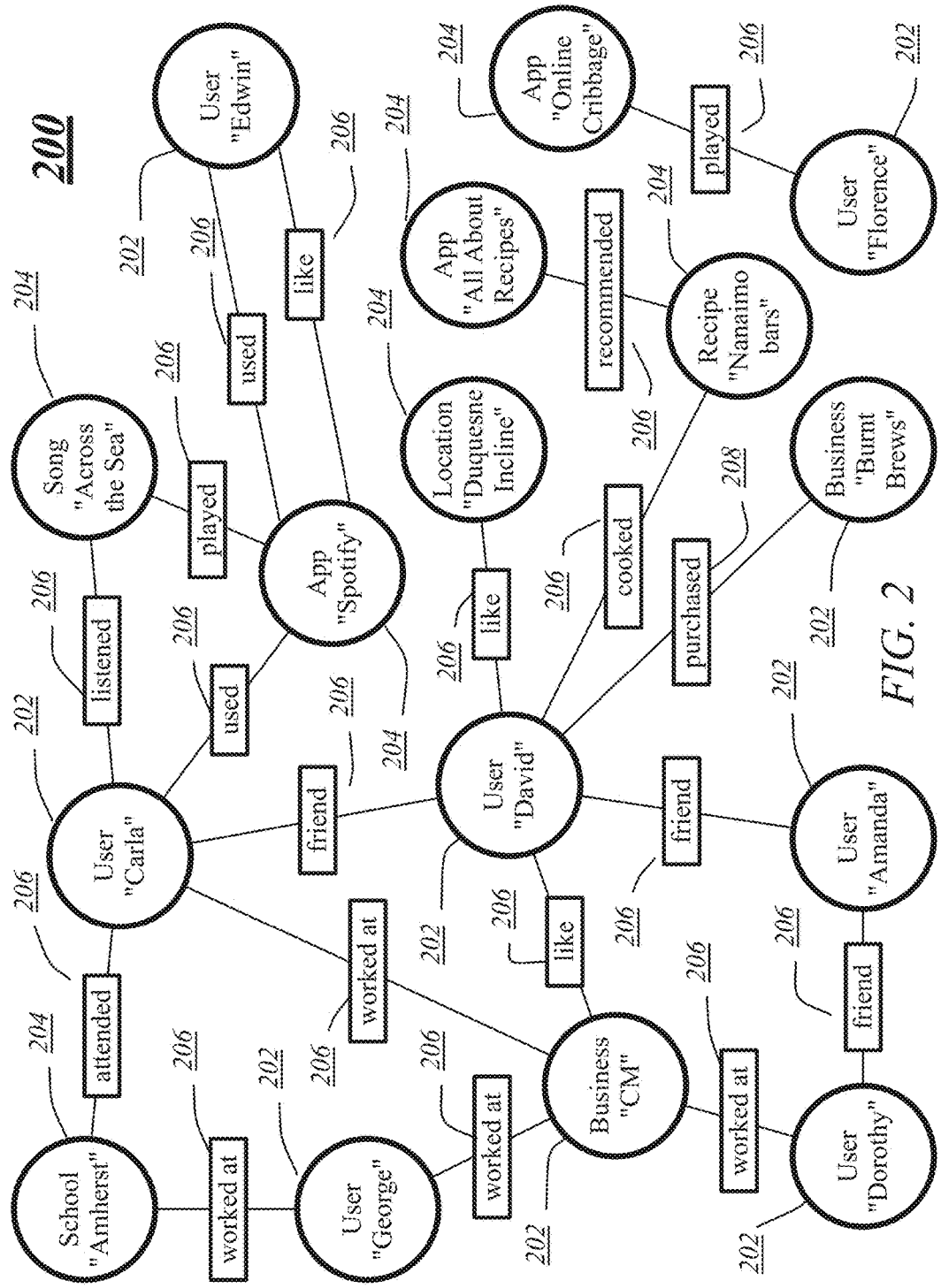
FIG. 2 illustrates an embodiment of a social graph

FIG. 2 illustrates an example of a social graph 200. In particular embodiments, a social-networking system may store one or more social graphs 200 in one or more data stores as a social graph data structure.

In particular embodiments, social graph 200 may include multiple nodes, which may include multiple user nodes 202 and multiple concept nodes 204. Social graph 200 may include multiple edges 206 connecting the nodes. In particular embodiments, a social-networking system, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking system may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to a consumer-to-business service and the consumer-to-business service may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

Figure 3A:
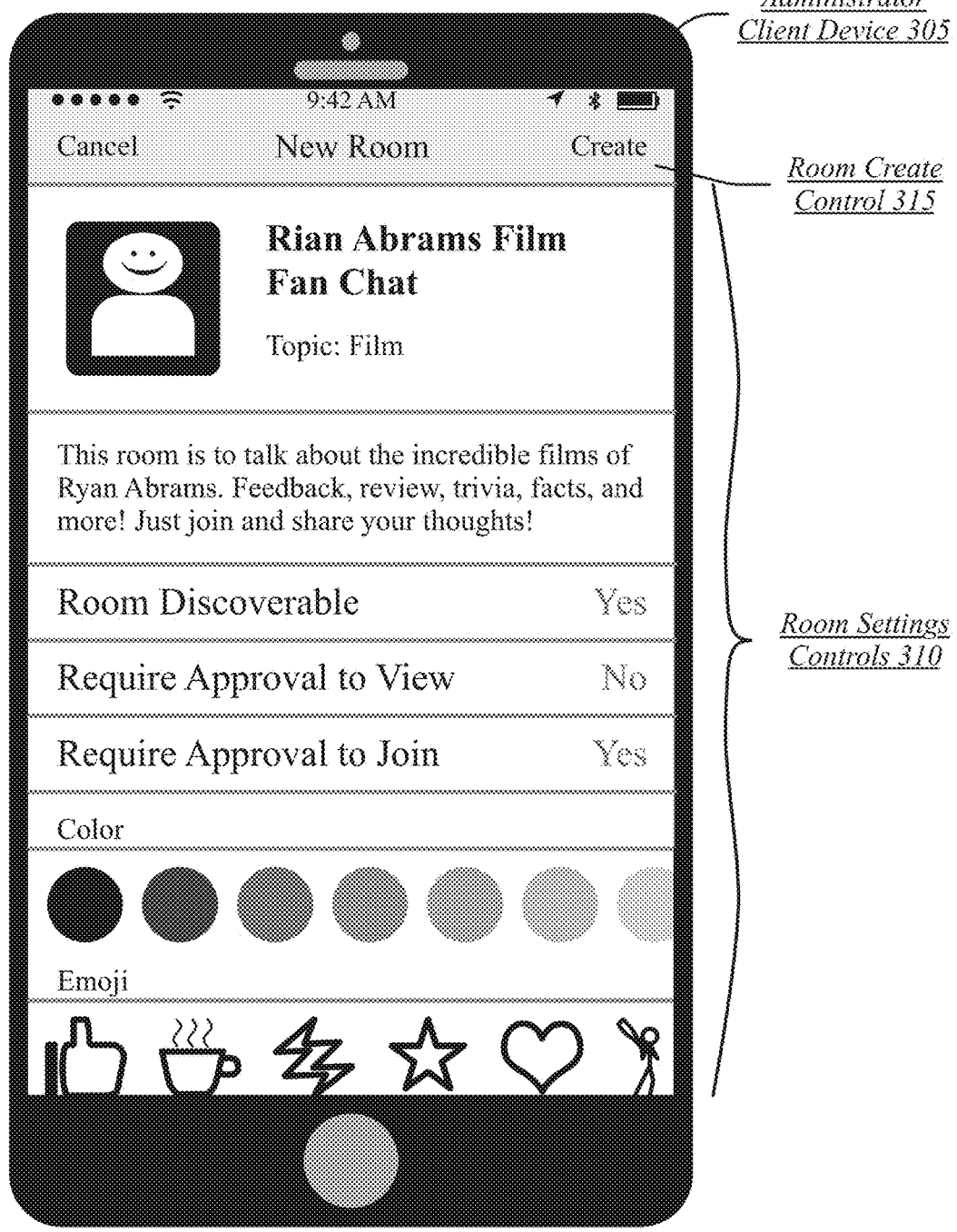
FIG. 3A illustrates a user interface for room settings controls.

FIG. 3A illustrates a user interface 300 for room settings controls 310.

An administrator client device 305 may correspond to any device used to access a messaging system. While in the illustrated embodiment of FIG. 3A the administrator client device 305 resembles a smartphone device, it will be appreciated that the techniques described herein may be used with any type of device. The user interface 300 may generally correspond to a display of a room creation interface for the messaging system. An administrator client device 305 may act as an administrator device based on it being used to administrate a group message thread.

A room creation interface may be used to create a public room, a public group message thread. This room creation interface may be reached via a variety of techniques. In some cases, a room creation interface may be associated with the creation of a new message thread specifically created to serve as a public group message thread. In other cases, a room creation interface may be associated with the conversation of an existing message thread (whether user-to-user or group) to a public group message thread.

The user interface 300 for room creation includes room settings controls 310. The room settings controls 310 empower the configuring of the public room. A room may be set as discoverable or not-discoverable, where a discoverable room is one which may be promoted, received as the result of search results, or otherwise discovered without the use of a joinable link. A room may be set as requiring approval to view or not requiring approval to view, where a user can only view the discussion within a room requiring approval to view if the administrator approves a user's request to do so. Where a room does not require approval to view, the discussion within the room may be viewed by people who have not been approved, including during a preview of the room. A room may be set as requiring approval to join, where a user can only participate (submit messages) to the discussion within a room requiring approval to join if the administrator approves a user's request to do so. Where a room does not require approval to join, the discussion within the room may be contributed to by people who have not been approved by an administrator.

The room settings controls 310 may include controls to customize a name of the room, a topic for the room, a description of the room, a color for the room, an emoji for the room, and a picture for the room. The name of the room may be used to identify the room to users and may be displayed in a menu bar for a messaging client when a user is viewing the room. The topic of the room may be used to categorize the room. In some embodiments, a predefined set of topics may be available to users, with a user selecting from among this predefined set to assign a topic to the room. In other embodiments, a user may be able to customize the topic without being restricted to a predefined set of topics. The topic may have a set maximum length, such as may be defined to fit within an index view or discovery view for message threads. This set maximum length for topics may be shorter than a set maximum length for descriptions, due to topics being used in a discovery view for comparing message thread, while a description being used in an expanded preview for an individual message thread. The color for the room may be used to customize the interface colors for one or more interface features of the message thread, such as may include, without limitation, a background color and a text bubble color. The emoji for a room may be used to customize a social approval icon used in the message thread. A social approval icon may be used to "approve," "like," or otherwise positively respond to interactions in the message thread. The picture for the room may be used as an icon for the room when the room is viewed in an index view.

The user interface 300 may include a room create control 315. The room create control 315 may create a public group message thread with the settings defined by the room settings controls 310. Where the message thread already exists, and is being transitioned to being a group message thread, the room create control 315 may transition the non-public message thread to being a public group message thread.

Figure 3B:
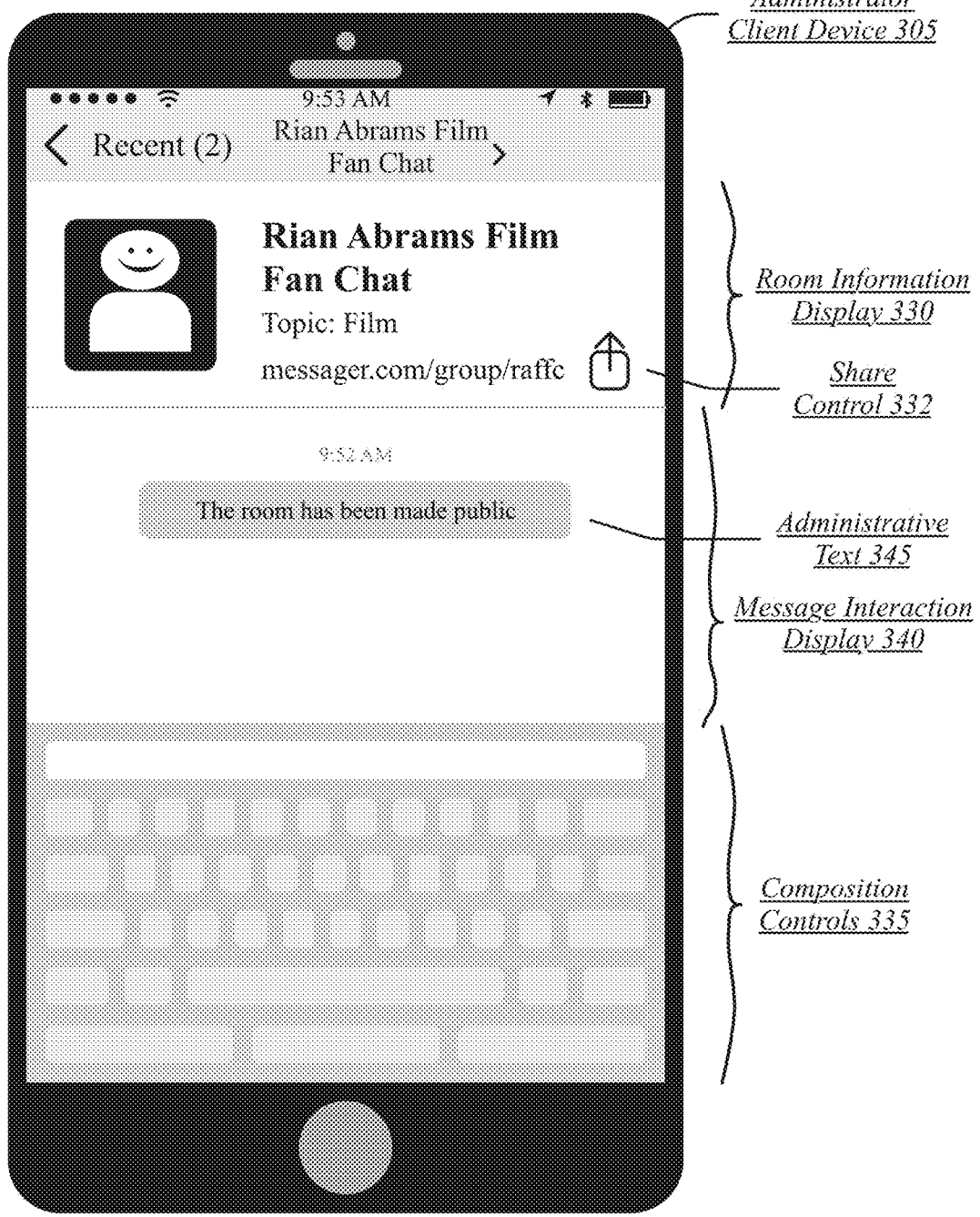
FIG. 3B illustrates a user interface for a created public message thread.

FIG. 3B illustrates a user interface 325 for a created public message thread.

The user interface 325 for a public message thread may include a room information display 330. The room information display 330 may include a display of one or more of the settings defined for the review, such as a room picture, room name, room title, or any other room element. The room information display 330 may include a share control 332. The share control 332 may empower access to link distribution controls for distributing the join invitation link for the public group message thread. For example, link distribution controls may include an email-share control, a messaging-share control, a social-network share control, or a distribution control for any other channel.

The user interface 325 for a public message thread may include a message interaction display 340. The message interaction display 340 may display message exchanged within the message thread. For a newly-created message thread, the message interaction display 340 may lack any messages for display due to no messages having yet be exchanged in the thread. A message interaction display 340 for a newly-created message thread may include administrative text 345 indicating that the room has been created and/or made public. The administrative text 345 may also be included where an existing message thread is made public, so as to notify participants in the message thread that their contributions to the thread—in some embodiments, only their future contributions—will be public. The administrative text 345 may be added to the message queue for each participant in the thread so as to distribute it to each of their client devices.

The user interface 325 for a message thread may include composition controls 335. Many, most, or nearly all of the composition controls 335 may empower access to and use of interface controls for the performance of various tasks, such as text entry, media selection, emoji selection, camera use, a social approval icon, etc. The controls may include text entry controls empowering the entering of text for the composition of text-based messages. The controls may include hardware controls. In some embodiments, controls may be touchscreen-based controls.

Figure 4A:
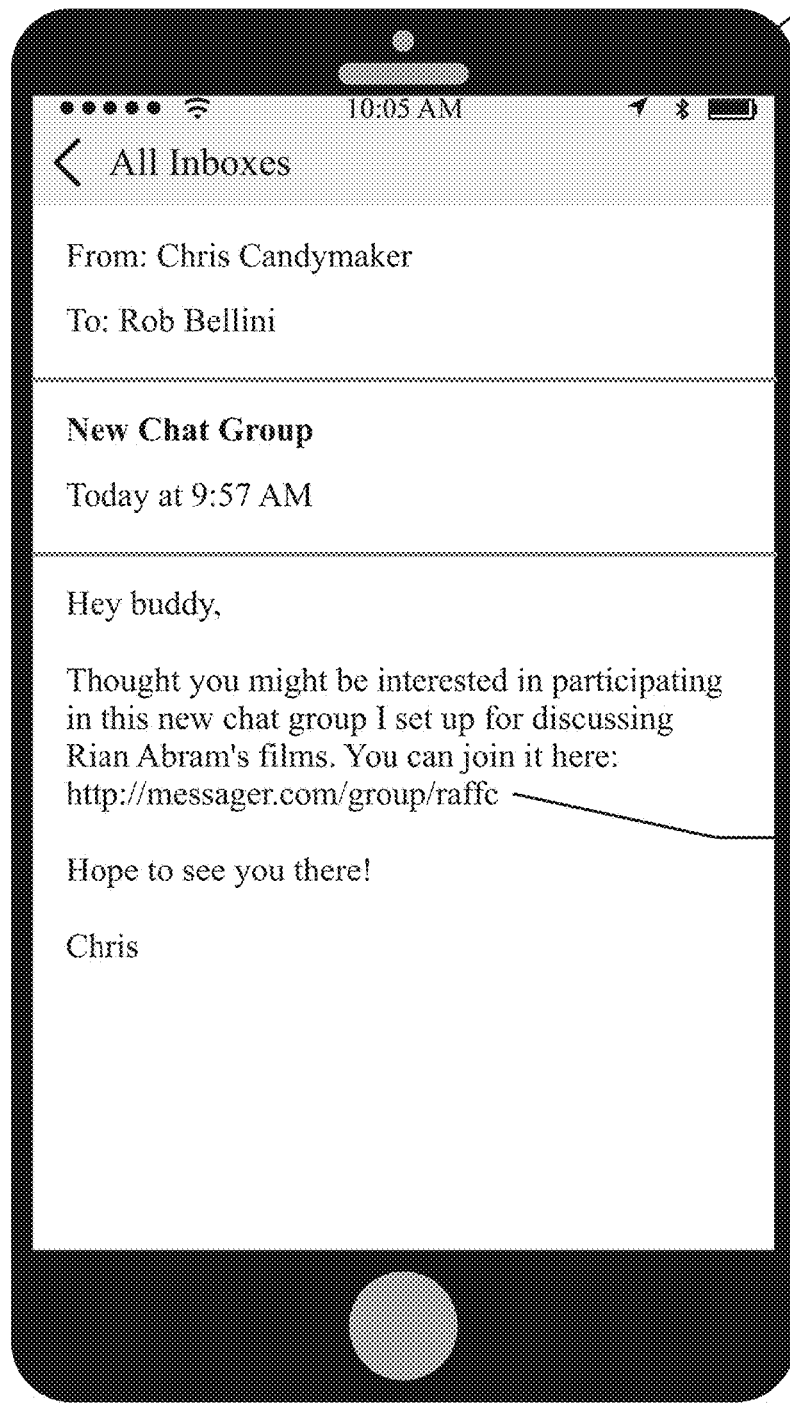
FIG. 4A illustrates a user interface for a join invitation link being received via an email.

FIG. 4A illustrates a user interface 400 for a join invitation link 415 being received via an email.

An invited client device 405 may correspond to any device used to access a messaging system. While in the illustrated embodiment of FIG. 4A the invited client device 405 resembles a smartphone device, it will be appreciated that the techniques described herein may be used with any type of device. The user interface 400 may generally correspond to a display of a room preview interface for the messaging system. An invited client device 405 may act as an invited device based on it being used by a user invited to a group message thread.

Thanks to the join invitation link 415 being a URL, the join invitation link 415 may be distributed by any channel or platform supporting the distribution of URLs, which includes all channels and platforms that support the distribution of text as URLs may be expressed purely as a text segment. For instance, as in the illustrated example, a join invitation link 415 may be distributed via an email. The use of the join invitation link 415 as a URL for a program supporting URLs, such as a web browser, directs a computer to the public group message thread.

The join invitation link 415 may be a uniform resource identifier (URI). The join invitation link 415 may deep link into an application on the invited client device 405. Such an application may be, without limitation, a native application or a web application. The application may be identified according to various techniques for deep linking. A messaging client may receive a URI and extract an identifier that identifies the linked-to message thread with the messaging system so as to empower the messaging client to add the user of the messaging client to the message thread.

Figure 4B:
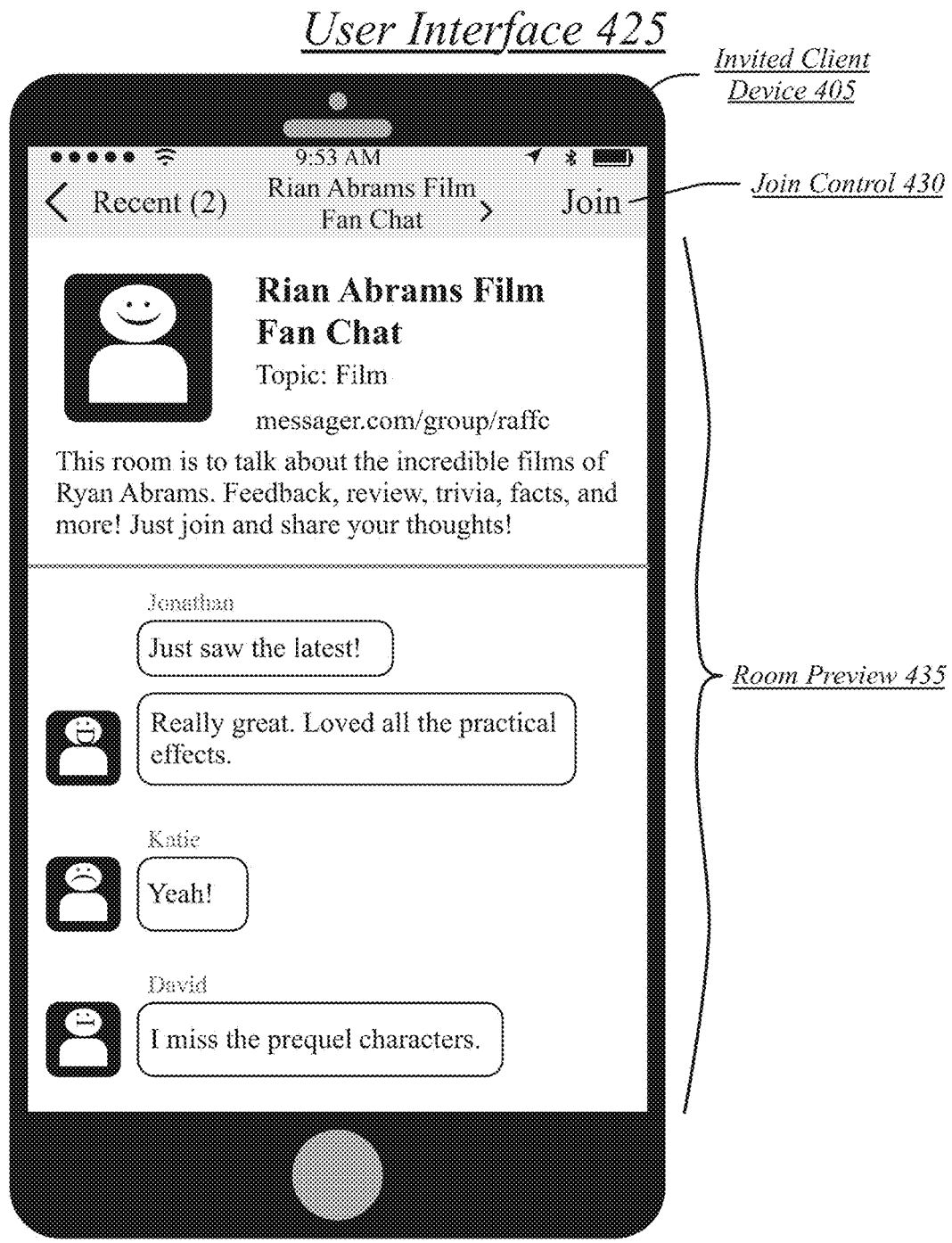
FIG. 4B illustrates a user interface for a public room preview.

FIG. 4B illustrates a user interface 425 for a public room preview 435.

The public room preview 435 may include a name for the room, picture for the room, topic for the room, description for the room, and/or any other room element. The room preview 435 may include a preview of the messaging contents of the room, such as one or more messages exchanged in the message thread interaction. The preview of the messaging contents of the room may only be displayed where the room settings controls 310 indicate that the room does not require approval to view.

The user interface 425 may comprise a join control 430. The join control 430 may empower the user to initiate the joining of the user the group message thread. Where the group message thread requires administrator approval to join, the join control 430 may instead be a join request control, though a join request control may be displayed the same in the user interface 425 as a join control 430.

Figure 5:
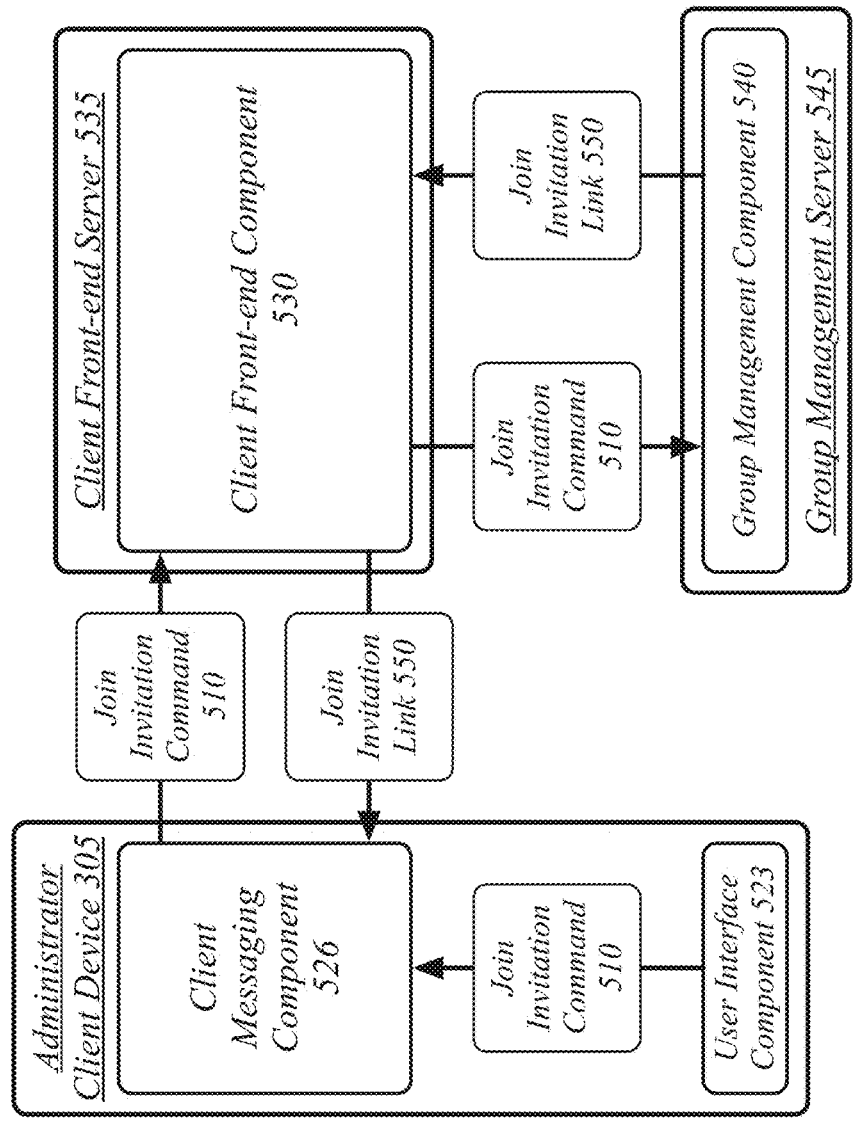
FIG. 5 illustrates a join invitation command generating a join invitation link.

FIG. 5 illustrates a join invitation command generating a join invitation link 550.

A messaging client may comprise a user interface component 523. A user interface component 523 may be generally arranged to display user interfaces to a user of a client device and to receive user commands for the messaging client for the client device. A messaging client may comprise a client messaging component 526. A client messaging component 526 may be generally arranged to conduct messaging interactions on the behalf of the messaging client via communication with the client front-end server 535.

A client front-end server 535 may be generally arranged to act as a network access point to the messaging system for client devices such as administrator client device 305 and invited client device 405. The client front-end server 535 may comprise a client front-end component 530, the client front-end component 530 generally arranged to act as a network access point to messaging services for the messaging system. The client front-end component 530 may receive messages from client devices and add the messages to message queues. A message queue may be specifically associated with the user of a client device, such as by being uniquely associated within the messaging system with a user account for the user of the client device. The message queue may be a single queue used for all messaging endpoints used by this user. The message queue may comprise a representation of updates in a strict linear order. The message queue may be organized as a data unit according to a variety of techniques. The message queue may be stored in semi-persistent memory, persistent storage, both semi-persistent memory and persistent storage, or a combination of the two. The message queue may be organized according to a variety of data structures, including linked lists, arrays, and other techniques for organizing queues. The message queue may generally comprise a first-in-first-out (FIFO) queue in which no update will be removed or retrieved from the queue before any updates that were received prior to it.

A group management server 545 may execute a group management component 540. The group management component 540 may be generally arranged to maintain a registry of group threads, to maintain a membership of the groups thread, to add members to group threads, to remove members to group threads, and to generally manage group threads. The group management component 540 may record message thread identifiers that uniquely identify group message threads. The group management component 540 may generate join invitation links that uniquely identify a particular public group message thread.

A user may use the user interface component 523 of a messaging client to initiate a join invitation command 510. The join invitation command 510 requests that a public group message thread be made available and a join invitation link 550 be created for access to it. The client messaging component 526 sends the join invitation command 510 to the client front-end component 530 as a network interaction. The client front-end component 530 receives the join invitation command 510, with the join invitation command 510 associated with a group message thread. The group message thread is associated with a message thread identifier, the message thread identifier uniquely identifying the group message thread on the messaging system.

In some cases, the join invitation command 510 may be associated with a creation command for the group message thread. A create command for the group message thread may specify a group message thread name, a group message thread topic, and a group message thread description. In other cases, the join invitation command 510 may be associated with an existing message thread, the existing group message thread comprising one or more existing messages. However, as a public group message thread may have greater use for being quickly understood than a private group message thread, a join invite command 510 may specify additional elements that aren't specified for a private group message thread, such as a group message thread name, a group message thread topic, and a group message thread description.

The join invitation command 510 may specify whether the group message thread is publically discoverable. Where a group message thread is publically discoverable, access to the group message thread may be promoted distinctly from distribution of the join invitation link 550. For instance, the messaging thread link system 100 may publish the join invitation on a social-networking service where the group message thread is publically discoverable. A group message thread may be publically discoverable based on one or more of geographic location, topic, group membership, and friend membership in the group message thread. The messaging thread link system 100 may suggest the group message thread to one or more users where the group message thread is publically discoverable, wherein a display of a suggestion for the group message thread is associated with a suggestion-motivation tag, the suggestion-motivation tag associated with geographic location, topic, group membership, or friend membership in the group message thread.

In some cases, a group message thread may be associated with a user group, such as a user group for a social-networking service. The group message thread may therefore be a public group message thread for use by members of the user group. As such, a join invitation command 510 may specify the group message thread as a user-group-only message thread. The messaging thread link system 100 may restrict access to the group message thread to the user group based on the join invitation command 510 specifying the group message thread as the user-group-only message thread. Any users not members of the user group would have a request or command to join the group automatically rejected by the group management component 540.

A join invitation command 510 may specify a group message thread as publically-viewable and as restricted-posting-only. In response, the group management component 540 may create a public-posting-enabled group message thread associated with the group message thread and display the public-posting-enabled group message thread in association with the group message thread. This public-posting-enable group message thread may be used for commentary on the restricted-posting-only group message thread.

The messaging thread link system 100 may suggest one or more of group message thread creation and join invitation link creation to the administrator client device 305 based on the administrator client device 305 being used to share and/or display a content item. The group message thread may then be associated with the content item. For instance, the display of a content item may have next to it a group message thread creation control displayed next to it to promote the creation of group message threads.

In some cases, the group management component 540 may create the group message thread as a merging of a first group message thread and a second group message thread. The group management component 540 may, via the client front-end component 530 and user interface component 523, recommend the merging of the first group message thread and the second group message thread based on the first group message thread and the second group message thread both being associated with a shared topic. For instance, two group message threads about the same article, media item, event, or other topic may be recommended for merging.

The merging of the group message threads may be suggested to the administrators of one or both groups. Each of the administrators may be informed that another, related public group message thread exists and be asked whether they approve of the message threads being merged. If an administrator for each of the message threads approves the merge, then the message threads may be combined together. A union may be performed of the user memberships of the group message threads, such that the membership of the combined public group message thread is the addition of the membership of the first group message thread and the second group message thread. Users may be notified that the public group message threads have merged, such as by displaying a notification or adding administrative text to the combined public group message thread indicating the merging. The message histories for the message threads may be combined. The group of administrators for the message threads may be combined.

Merging of group message threads may particularly be warranted and practical where the group message threads have at least one member in common, so as to avoid distribution this user's messaging experience across two similar threads and to leverage this user's dual membership to aid the process of merging group message threads. The group management component 540 may determine that two group message threads exist that are associated with a shared topic and a shared member. In some embodiments, the group management component 540 may recommend the merging of the group message threads in response to the group message threads having both the same shared topic and the shared member. In other embodiments, the group management component 540 may recommend the merging of the group message threads in response to the group message threads having the same shared topic whether or not there is a shared member, but then leverage the existence of the shared member in merging the group message threads. In either embodiment, where the group message threads have a shared member, the shared member may be asked for approval for merging the group message threads and the shared member may be assigned the task of administering the group message threads, such as by configuring a name, a description, and any other elements of the combined group message thread, such as any elements that may be defined for a group message thread.

The group management component 540 generates a join invitation link 550 in response to the join invitation command. The join invitation link 550 comprises a thread invitation identifier. The thread invitation identifier is a hash of the message thread identifier. The use of a distinct identifier for the join invitation link 550 and the internal persistent identifier for the group message thread may enable the revocation of the association between the two identifiers, so as to empower the revocation of a join invitation link 550 by an administrator. The group management component 510 may store the thread invitation identifier for the group message thread in an invitation link mapping table as being associated with the message thread identifier so as to empower retrieval of the message thread identifier based on the thread invitation identifier embedded in the join invitation link 550. The thread invitation identifier may be a text segment, with the text segment a portion of the URL that is the join invitation link 550.

The client front-end component 530 then sends the join invitation link to the administrator client device. The join invitation link 550 may then be distributed, such as by one or more of a web site, email message, short message service (SMS) message, and social-networking service message. The join invitation link 550 may be expressed as a uniform resource locator, uniform resource indicator, or machine-readable optical label. The join invitation link 550 may be accessed based on a web control or app control, such as a web control or app control that enacts access to the URL of the join invitation link 550. The join invitation link 550 may comprise a deep link, the deep link assigned to an application on a client device. An application on a client device may be, without limitation, a native application or a web application.

The join invitation link 550 may be received via a hyperlink or web control embedded in a web page. This may be particular useful where the group message thread is displayed embedded in the web page. The use of the messaging system to implement the group message thread may be useful where participation in the group message thread, such as may be embedded in the web page, is based on real-world names. Real-world names for users may be particularly be available where the messaging system is associated with a social-networking service.

A join invitation command 510 may specify whether the group message thread requires administrator approval for joining. The client front-end component 530 may receive a group join request for the group message thread based on the join invitation link 550 and send an administrator group join approval query to an administrator user account for the group message thread where the group message thread requires administrator approval for joining. The administrator user account may be associated with the administrator client device 305.

The client front-end component 530 may receive a join invitation refresh command associated with the group message thread. The group management component 540 may generate a second join invitation link in response to the join invitation refresh command, the second join invitation link comprising a second thread invitation identifier, wherein the second thread invitation identifier is a second hash of the message thread identifier. The group management component 540 then disassociates the thread invitation identifier for the group message thread from the message thread identifier in the invitation link mapping table and stores the second thread invitation identifier for the group message thread in the invitation link mapping table as associated with the message thread identifier. The client front-end component 530 then sends the second join invitation link to the administrator client device 305. Disassociating the thread invitation identifier for the group message thread from the message thread identifier in the invitation link mapping table may comprise removing the thread invitation identifier from the invitation link mapping table. Disassociating the thread invitation identifier for the group message thread from the message thread identifier in the invitation link mapping table may comprise marking the thread invitation identifier as deactivated in the invitation link mapping table. This marking as deactivated may be used to prevent reuse of that particular hashing of the message thread identifier.

The client front-end component 530 may receive a user block command in association with the group message thread and a specified-for-blocking user account, the user block command received from an administrator user account for the group message thread. The group management component 540 then blocks access to the group message thread by the specified-for-blocking user account. In some cases, the administrator user account may be associated with the administrator client device 305 from which the join invitation command is received, but in other cases the same administrator may use a different device, or a different administrator may perform the user block command.

The client front-end component 530 may receive a user block request in association with the group message thread and the specified-for-blocking user account, the user block command received from a non-administrator user account for the group message thread. The group management component 540 may send an administrator user block approval query to the administrator user account and receive the user block command in response to the administrator user block approval query.

In some cases, the group message thread may use per-message ephemerality. or global ephemerality. With per-message ephemerality, each message from the group message thread may be removed after a defined period of time. With global ephemerality, the entirety of the group message thread may be removed after a defined period of time or at a defined point in time. The messaging system may use device-to-device encryption for the group message thread, wherein encryption information for the device-to-device encryption is embedded in the join invitation link 550. For instance, the join invitation link 550 may include a public key that may be used to perform a key exchange for device-to-device encryption according to known key exchange techniques.

The administrator client device 305 may pin a pinned message in the group message thread based on an administrator pinned message command. Similarly, the administrator client device 305 may pin a media item to the group message thread based on an administrator pinned media item command. A pinned element may be displayed prominently within the message thread, such as persistently at the top of a view of the group message thread.

Figure 6:
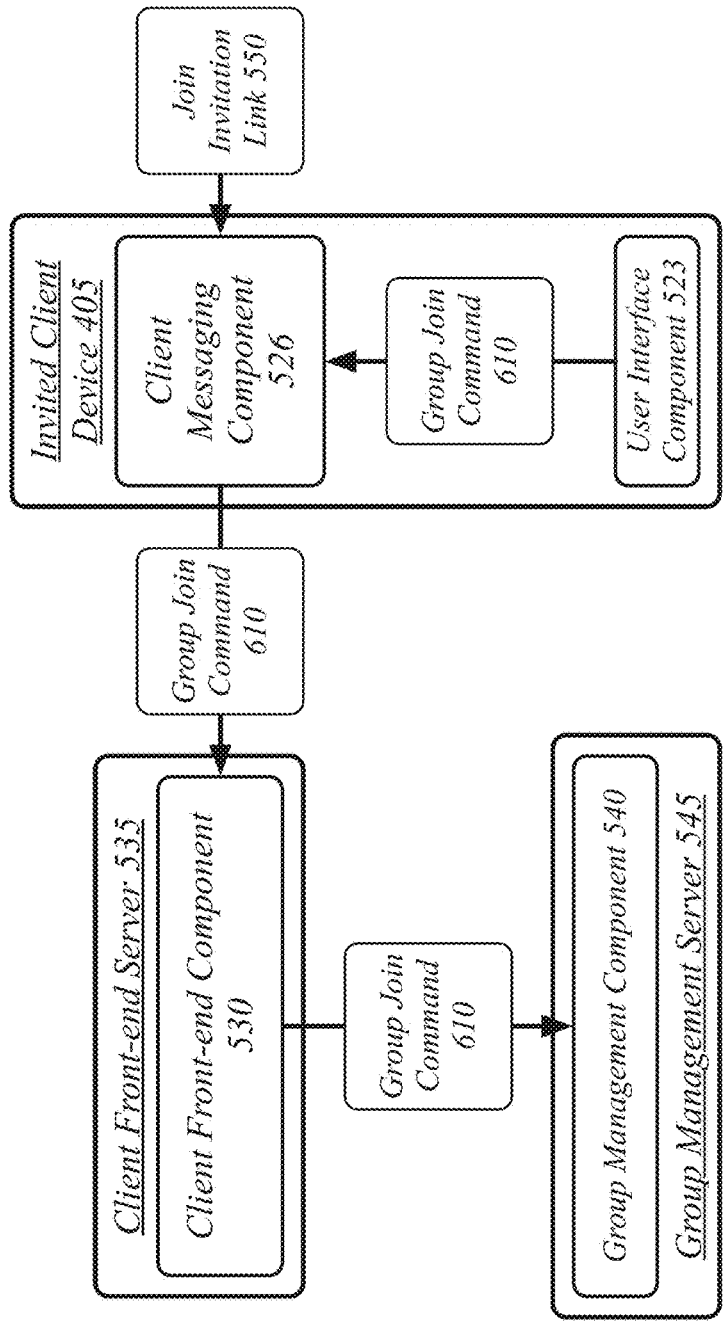
FIG. 6 illustrates a group join command based on a join invitation link.

FIG. 6 illustrates a group join command based 610 on a join invitation link 550.

A client messaging component 526 may receive a join invitation link 550 at a messaging client on an invited client device 405. The join invitation link 550 comprises a thread invitation identifier. The thread invitation identifier identifies a group message thread on a messaging system. If the join invitation link 550 is activated by a user, the user interface component 524 displays a group message thread preview for the group message thread based on the join invitation link 550. The group message thread preview may comprise a group message thread name, group message thread topic, group message thread description, and group message thread participant list. The group message thread preview may comprise a join control where the group message thread does not require administrator approval to join. The group message thread preview comprising a join request control where the group message thread requires administrator approval to join.

The user interface component 523 receives a group join command at the messaging client and passes it to the client messaging component 526 for sending to the messaging system. The client messaging component 526 adds a user account to the group message thread with the messaging system in response to receiving the group join command 610 by identifying the group message thread to the messaging system using the thread invitation identifier. The group join command 610 is sent to the group management component 540 via the client front-end component 530.

The group management component 540 receives a join request as a group join command 610 from a requesting client device, such as the invited client device 405, the join request comprising the join invitation link 550, the join request associated with a joining user account with the messaging system. The group management component 540 extracts the thread invitation identifier from the join invitation link 500, retrieves the message thread identifier for the group message thread from the invitation link mapping table based on the thread invitation identifier, and adds the joining user account to the group message thread with the messaging system.

In some cases, administrator approval may be required to join a group. The user of the invited client device 405 may request approval to join the group and wait until approval is received to participate in the group. In some instances, approval may be received sufficiently promptly that the user is still viewing the preview for the group message thread. The client messaging component 526 may receive the group join approval from an administrator account for the group message thread and, in response, the user interface component 523 may transition from displaying to the group message thread preview to displaying a group message thread interface where the invited client device 405 is displaying the group message thread preview when the group join approval is received. In either case, the client messaging component 526 may receive a group join approval from an administrator account for the group message thread and add a group message thread index entry to a first position of an inbox index. This may be performed where the invited client device 405 is not displaying the group message thread preview when the group join approval is received and/or may be performed where the invited client device 405 is displaying the group message thread preview when the group join approval is received.

A group message thread may support replies, such that the client frontend component receives a reply message for the group message thread, the reply message in reply to a particular previous message of the group message thread. The reply message may be displayed to indicate that it is a reply to the particular previous message.

The messaging client may determine that a user account has not been created for the messaging system when a user attempts to activate a join invitation link 550. The user interface component 513 may initiate creation of the user account in response to determining that the user account has not been created for the messaging system and the group join command, given user permission to create the user account. For instance, the user interface component 523 may display information indicating that a user account must be created to participate in the group message thread and collect information for user account creation. The client messaging component 526 may then receive a user account creation confirmation for the user account from the messaging system and add the user account to the group message thread in response to the user account creation confirmation where the creation of the user account was initiated in response to the group join command.

Adding the user account to the group message thread in response to the user account creation confirmation may be performed automatically, without additional user action, where the creation of the user account was initiated in response to the group join command 610. However, in some embodiments the messaging client may confirm group joining first. The client messaging component 526 receives a user account creation confirmation for the user account from the messaging system and the user interface component 523 instantiates a group join dialog for the group message thread in response to the user account creation confirmation where the creation of the user account was initiated in response to the group join command 610. The client message component 526 then adds the user account to the group message thread in response to a group join dialog affirmation.

The user interface component 523 may display a spam control in association with the group message thread empowering users to report spam, so as to request that an administrator remove the spam messages and, possibly, block the spamming user.

Interactions within a public group message thread may be used to suggest that mutual participants in the public group message thread should become contacts for one another with the messaging system so as to enable messaging communication outside the public group message thread. A contact recommendation component may detect one or more group-thread user accounts participating in the group message thread and suggest the one or more group-thread user account as contacts for the user account with the messaging system.

In some embodiments, contact recommendations may be based on an association value for contact between two users. This association value may be calculated by summing or otherwise mathematically combining various measures of the relationship between users, such as mutual friends, shared locations, shared events, group message thread interactions, etc. The contribution to this association value used for a public group message thread may be lower than for a private group message thread due to the lower implied connection between the users. As such, the contact recommendation component may detect one or more group-thread user accounts participating in the group message thread and add a shared-public-group-thread value to an association value between the user account and the one or more group-thread user accounts also participating in the public group message thread, wherein the shared-public-group-thread value is lower than a private-group-thread value for the messaging system.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7A illustrates one embodiment of a logic flow 700. The logic flow 700 may be representative of some or all of the operations executed by one or more embodiments described herein.

In the illustrated embodiment shown in FIG. 7A, the logic flow 700 may receive a join invitation command associated with a group message thread from an administrator client device, the group message thread associated with a message thread identifier, the message thread identifier identifying the group message thread on a messaging system at block 702.

The logic flow 700 may generate a join invitation link in response to the join invitation command, the join invitation link comprising a thread invitation identifier, wherein the thread invitation identifier is a hash of the message thread identifier at block 704.

The logic flow 700 may send the join invitation link to the administrator client device at block 706.

FIG. 7B illustrates one embodiment of a logic flow 750. The logic flow 750 may be representative of some or all of the operations executed by one or more embodiments described herein.

In the illustrated embodiment shown in FIG. 7B, the logic flow 750 may receive a join invitation link at a messaging client on a client device, the join invitation link comprising a thread invitation identifier, the thread invitation identifier identifying a group message thread on a messaging system at block 752.

The logic flow 750 may receive a group join command at the messaging client at block 754.

The logic flow 750 may add a user account to the group message thread with the messaging system in response to receiving the group join command by identifying the group message thread to the messaging system using the thread invitation identifier at block 756.

The embodiments are not limited to these examples.

Figure 8:
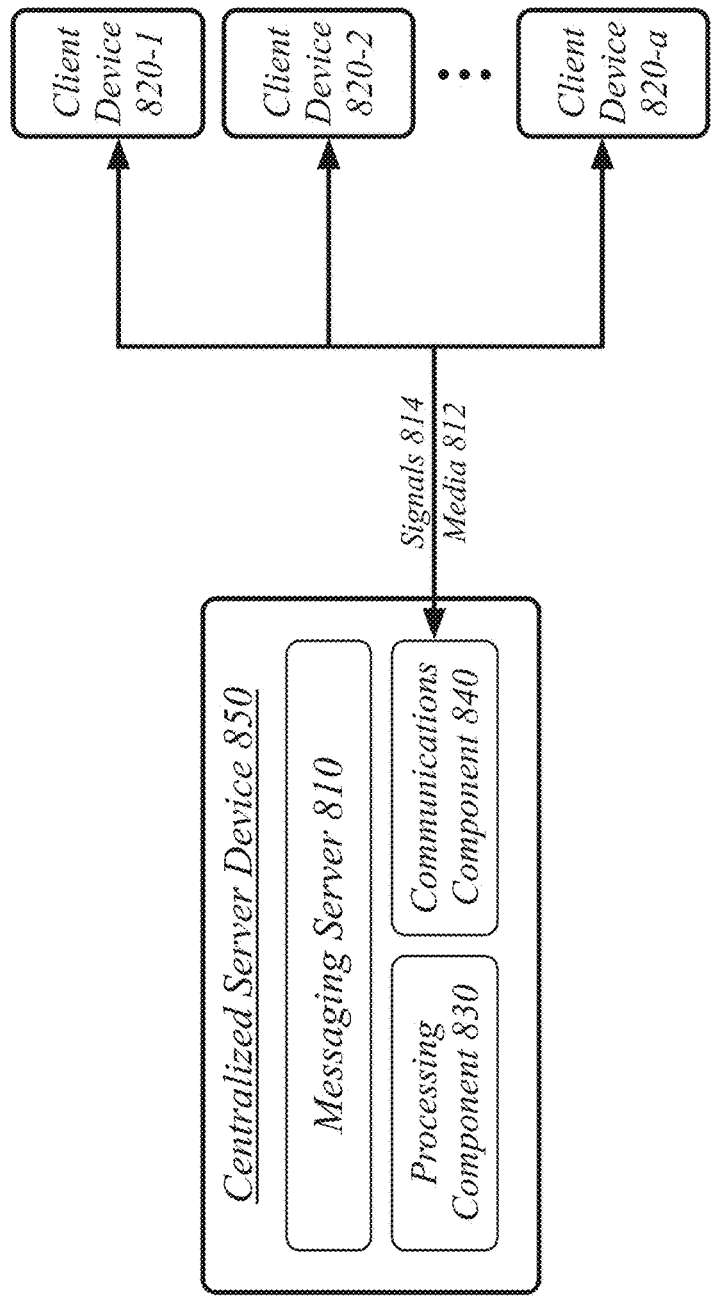
FIG. 8 illustrates an embodiment of a centralized system for the system of FIG. 1.

FIG. 8 illustrates a block diagram of a centralized system 800. The centralized system 800 may implement some or all of the structure and/or operations for the messaging thread link system 100 in a single computing entity, such as entirely within a single centralized server device 850.

The centralized server device 850 may comprise any electronic device capable of receiving, processing, and sending information for the messaging thread link system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 850 may execute processing operations or logic for the messaging thread link system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 850 may execute communications operations or logic for the messaging thread link system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 850 may communicate with other devices over a communications media 812 using communications signals 814 via the communications component 840. The devices may be internal or external to the centralized server device 850 as desired for a given implementation.

The centralized server device 850 may execute a messaging server 810. The messaging server 810 may comprise a messaging server for a messaging system, such as a messaging server performing messaging server functions as described for the messaging servers 110 in reference to FIG. 1. The messaging server 810 may provide messaging operations for a plurality of client devices 820, receiving and sending messages between the client devices 820.

Figure 9:
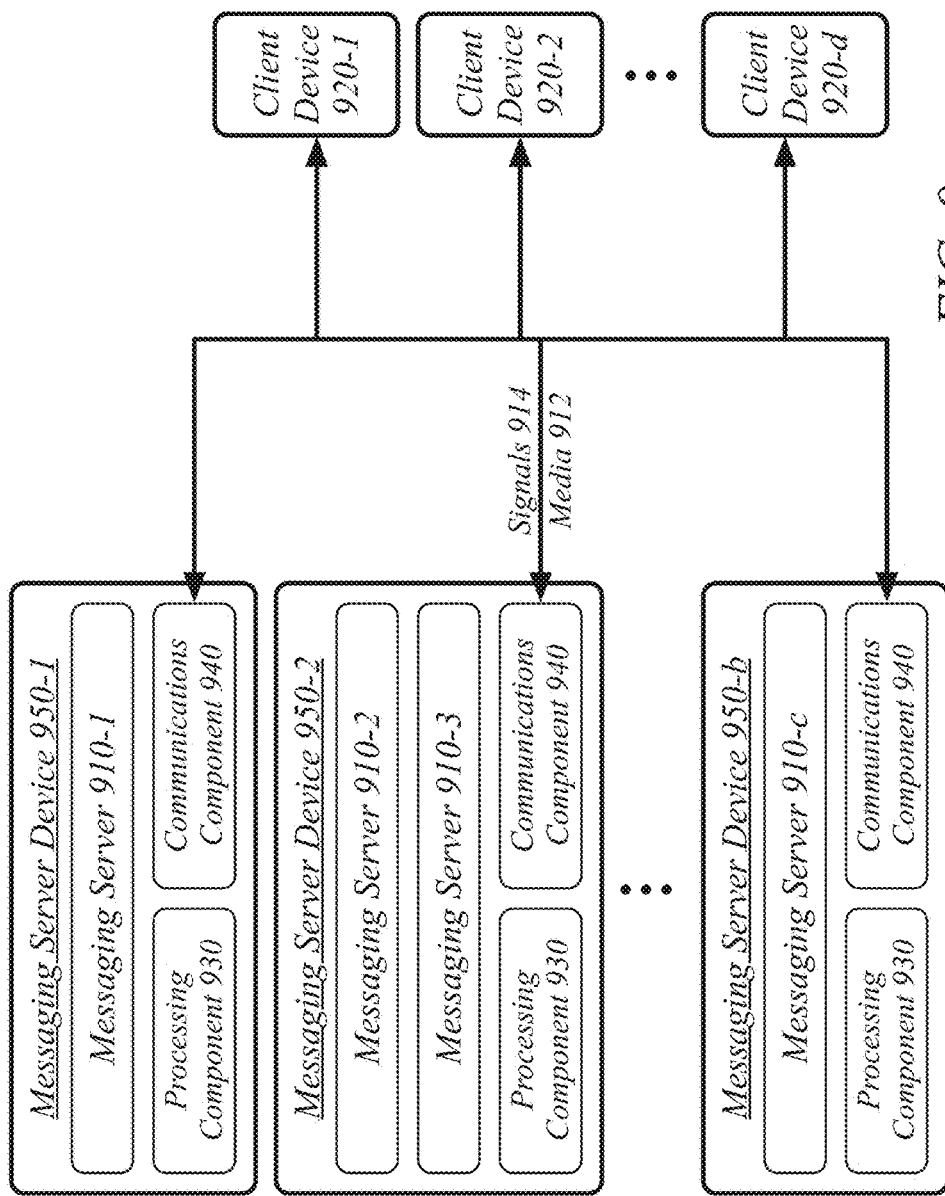
FIG. 9 illustrates an embodiment of a distributed system for the system of FIG. 1.

FIG. 9 illustrates a block diagram of a distributed system 900. The distributed system 900 may distribute portions of the structure and/or operations for the messaging thread link system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a plurality of messaging server devices 950. In general, the server devices 950 may be the same or similar to the centralized server device 850 as described with reference to FIG. 8. For instance, the server devices 950 may each comprise a processing component 930 and a communications component 940 which are the same or similar to the processing component 830 and the communications component 840, respectively, as described with reference to FIG. 8. In another example, the server devices 950 may communicate over a communications media 912 using communications signals 914 via the communications components 940.

The messaging server devices 950 may comprise or employ one or more server programs that operate to perform various methodologies in accordance with the described embodiments. In one embodiment, for example, the messaging server devices 950 may each execute one of a plurality of messaging servers 910. The messaging servers 910 may comprise messaging servers for a messaging system, such as a messaging servers performing messaging server functions as described for the messaging servers 110 in reference to FIG. 1. The messaging servers 910 may provide messaging operations for a plurality of client devices 920, receiving and sending messages between the client devices 920.

Figure 10:
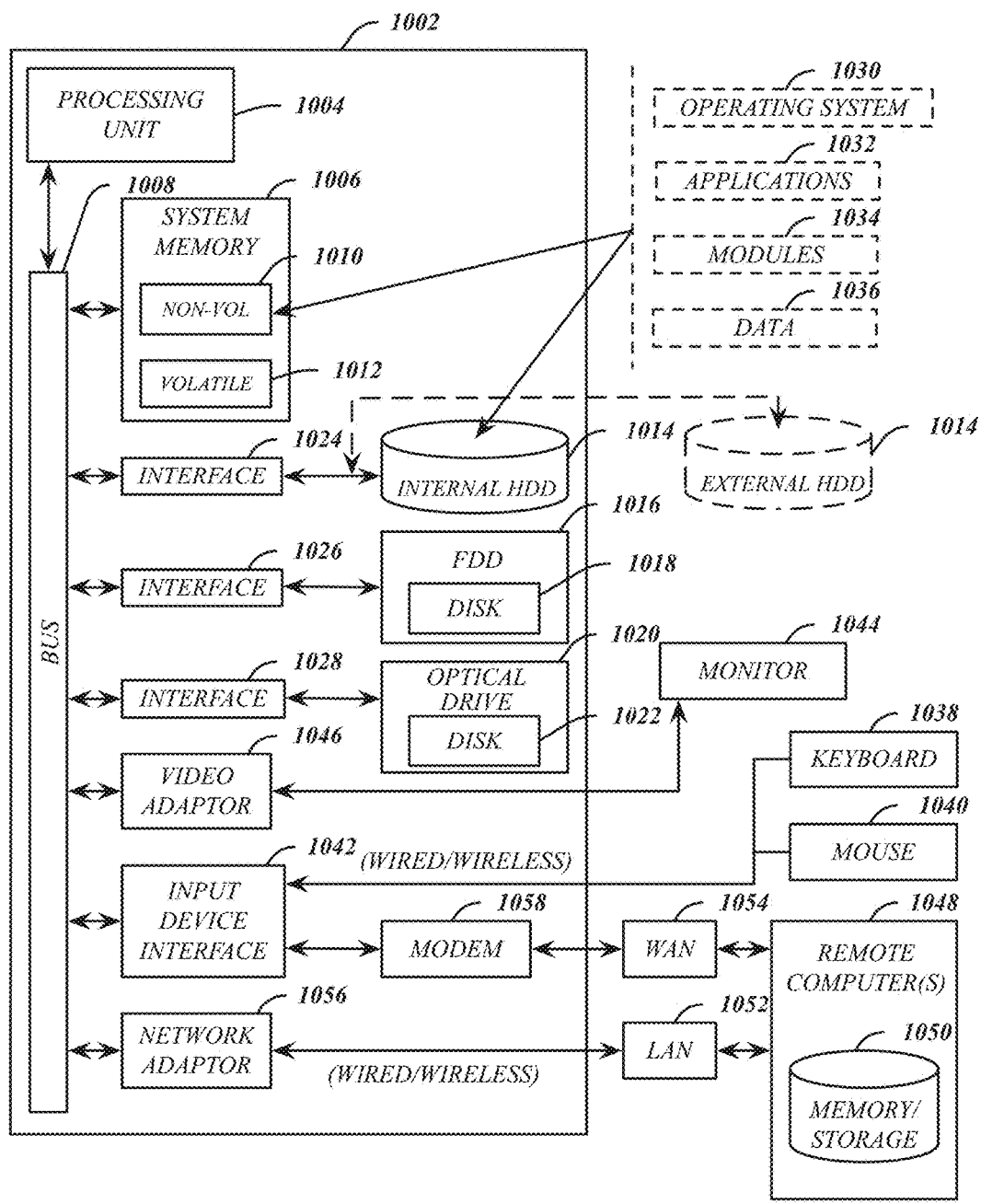
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, 9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the messaging thread link system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
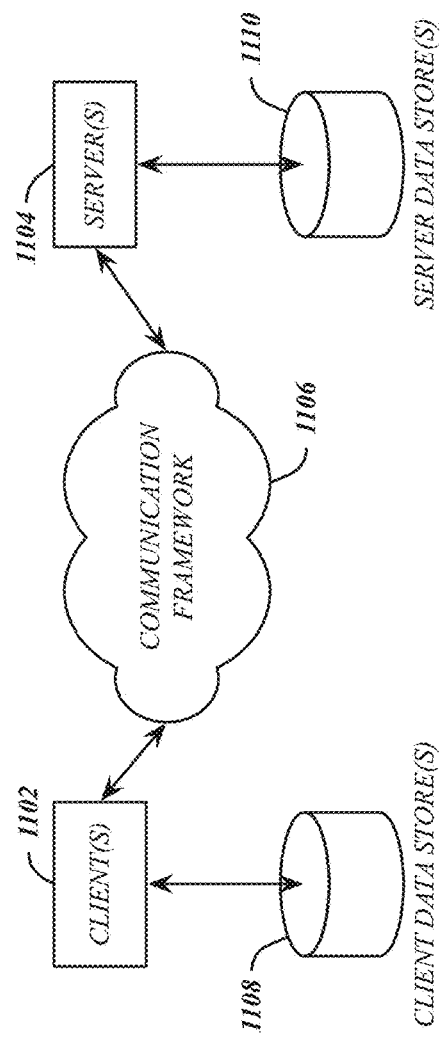
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may correspond to messaging clients. The servers 1104 may correspond to messaging servers. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
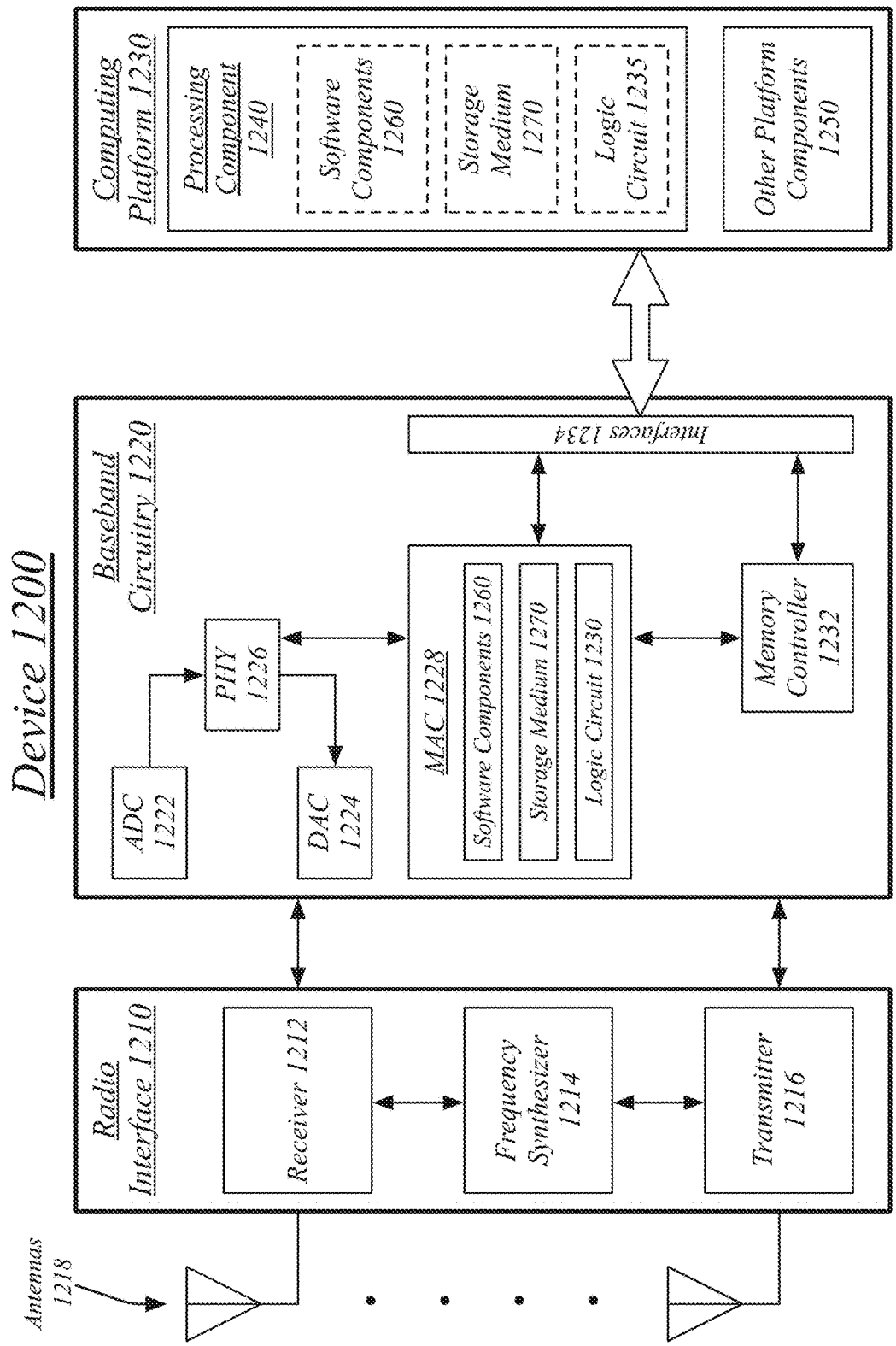
FIG. 12 illustrates an embodiment of a radio device architecture.

FIG. 12 illustrates an embodiment of a device 1200 for use in a multicarrier OFDM system, such as the messaging thread link system 100. Device 1200 may implement, for example, software components 1260 as described with reference to messaging thread link system 100 and/or a logic circuit 1235. The logic circuit 1235 may include physical circuits to perform operations described for the messaging thread link system 100. As shown in FIG. 12, device 1200 may include a radio interface 1210, baseband circuitry 1220, and computing platform 1230, although embodiments are not limited to this configuration.

The device 1200 may implement some or all of the structure and/or operations for the messaging thread link system 100 and/or logic circuit 1235 in a single computing entity, such as entirely within a single device. Alternatively, the device 1200 may distribute portions of the structure and/or operations for the messaging thread link system 100 and/or logic circuit 1235 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1256 for PHY link layer processing of respective receive/transmit signals. Baseband circuitry 1220 may include, for example, a processing circuit 1228 for medium access control (MAC)/ data link layer processing. Baseband circuitry 1220 may include a memory controller 1232 for communicating with processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames, such as radio frames. Alternatively or in addition, MAC processing circuit 1228 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for the messaging thread link system 100 and logic circuit 1235 using the processing component 1240. The processing component 1240 (and/or PHY 1226 and/or MAC 1228) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 1202.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a join invitation command associated with a group message thread from an administrator client device, the group message thread associated with a message thread identifier, the message thread identifier identifying the group message thread on a messaging system; generating a join invitation link in response to the join invitation command, the join invitation link comprising a thread invitation identifier, wherein the thread invitation identifier is a hash of the message thread identifier; and sending the join invitation link to the administrator client device.

A computer-implemented method may further comprise storing the thread invitation identifier for the group message thread in an invitation link mapping table as associated with the message thread identifier; receiving a join request from a requesting client device, the join request comprising the join invitation link, the join request associated with a joining user account with the messaging system; extracting the thread invitation identifier from the join invitation link; retrieving the message thread identifier for the group message thread from the invitation link mapping table based on the thread invitation identifier; and adding the joining user account to the group message thread with the messaging system.

A computer-implemented method may further comprise receiving a join invitation refresh command associated with the group message thread; generating a second join invitation link in response to the join invitation refresh command, the second join invitation link comprising a second thread invitation identifier, wherein the second thread invitation identifier is a second hash of the message thread identifier; disassociating the thread invitation identifier for the group message thread from the message thread identifier in the invitation link mapping table; storing the second thread invitation identifier for the group message thread in the invitation link mapping table as associated with the message thread identifier; sending the second join invitation link to the administrator client device.

A computer-implemented method may further comprise wherein disassociating the thread invitation identifier for the group message thread from the message thread identifier in the invitation link mapping table comprises removing the thread invitation identifier from the invitation link mapping table.

A computer-implemented method may further comprise wherein disassociating the thread invitation identifier for the group message thread from the message thread identifier in the invitation link mapping table comprises marking the thread invitation identifier as deactivated in the invitation link mapping table.

A computer-implemented method may further comprise the join invitation link distributed via one or more of a web site, email message, short message service message, and social-networking service message.

A computer-implemented method may further comprise the join invitation command associated with a creation command for the group message thread.

A computer-implemented method may further comprise the create command for the group message thread specifying a group message thread name, a group message thread topic, and a group message thread description.

A computer-implemented method may further comprise the group message thread comprising one or more existing messages.

A computer-implemented method may further comprise the join invitation command specifying whether the group message thread is publically discoverable.

A computer-implemented method may further comprise publishing the join invitation on a social-networking service where the group message thread is publically discoverable.

A computer-implemented method may further comprise wherein the group message thread is publically discoverable based on one or more of geographic location, topic, group membership, and friend membership in the group message thread.

A computer-implemented method may further comprise suggesting the group message thread to one or more users where the group message thread is publically discoverable, wherein a display of a suggestion for the group message thread is associated with a suggestion-motivation tag, the suggestion-motivation tag associated with geographic location, topic, group membership, or friend membership in the group message thread.

A computer-implemented method may further comprise receiving a user block command in association with the group message thread and a specified-for-blocking user account, the user block command received from an administrator user account for the group message thread; and blocking access to the group message thread by the specified-for-blocking user account.

A computer-implemented method may further comprise the administrator user account associated with the administrator client device from which the join invitation command is received.

A computer-implemented method may further comprise receiving a user block request in association with the group message thread and the specified-for-blocking user account, the user block command received from a non-administrator user account for the group message thread; sending an administrator user block approval query to the administrator user account; and receiving the user block command in response to the administrator user block approval query.

A computer-implemented method may further comprise the join invitation command specifying whether the group message thread requires administrator approval for joining.

A computer-implemented method may further comprise receiving a group join request for the group message thread based on the join invitation link; and sending an administrator group join approval query to an administrator user account for the group message thread where the group message thread requires administrator approval for joining.

A computer-implemented method may further comprise suggesting one or more of group message thread creation and join invitation link creation to the administrator client device based on the administrator client device being used to share and/or display a content item, wherein the group message thread is associated with the content item.

A computer-implemented method may further comprise the group message thread associated with a user group, the join invitation command specifying the group message thread as a user-group-only message thread, further comprising: restricting access to the group message thread to the user group based on the join invitation command specifying the group message thread as the user-group-only message thread.

A computer-implemented method may further comprise the join invitation command specifying the group message thread as publically-viewable and as restricted-posting-only.

A computer-implemented method may further comprise creating a public-posting-enabled group message thread associated with the group message thread; and displaying the public-posting-enabled group message thread in association with the group message thread.

A computer-implemented method may further comprise creating the group message thread as a merging of a first group message thread and a second group message thread.

A computer-implemented method may further comprise recommending the merging of the first group message thread and the second group message thread based on the first group message thread and the second group message thread both being associated with a shared topic.

A computer-implemented method may further comprise the group message thread using per-message ephemerality.

A computer-implemented method may further comprise the group message thread using global ephemerality.

A computer-implemented method may further comprise the messaging system using device-to-device encryption for the group message thread, wherein encryption information for the device-to-device encryption is embedded in the join invitation link.

A computer-implemented method may further comprise pinning a pinned message in the group message thread based on an administrator pinned message command.

A computer-implemented method may further comprise pinning a media item to the group message thread based on an administrator pinned media item command.

A computer-implemented method may further comprise receiving a reply message for the group message thread, the reply message in reply to a particular previous message of the group message thread.

An apparatus may comprise a processor circuit on a device; a client front-end component operative on the processor circuit to receive a join invitation command associated with a group message thread from an administrator client device, the group message thread associated with a message thread identifier, the message thread identifier identifying the group message thread on a messaging system; and send a join invitation link to the administrator client device; and a group management component operative to generate a join invitation link in response to the join invitation command, the join invitation link comprising a thread invitation identifier, wherein the thread invitation identifier is a hash of the message thread identifier. The apparatus may be operative to implement any of the computer-implemented methods described herein.

A computer-implemented method may comprise receiving a join invitation link at a messaging client on a client device, the join invitation link comprising a thread invitation identifier, the thread invitation identifier identifying a group message thread on a messaging system; receiving a group join command at the messaging client; and adding a user account to the group message thread with the messaging system in response to receiving the group join command by identifying the group message thread to the messaging system using the thread invitation identifier.

A computer-implemented method may further comprise the join invitation link expressed as a uniform resource locator or machine-readable optical label.

A computer-implemented method may further comprise the join invitation link accessed based on a web control or app control.

A computer-implemented method may further comprise displaying a group message thread preview for the group message thread based on the join invitation link.

A computer-implemented method may further comprise the group message thread preview comprising a group message thread name, group message thread topic, group message thread description, and group message thread participant list.

A computer-implemented method may further comprise the group message thread preview comprising a join control where the group message thread does not require administrator approval to join.

A computer-implemented method may further comprise the group message thread preview comprising a join request control where the group message thread requires administrator approval to join.

A computer-implemented method may further comprise receiving a group join approval from an administrator account for the group message thread; and transitioning from displaying to the group message thread preview to displaying a group message thread interface where the client device is displaying the group message thread preview when the group join approval is received.

A computer-implemented method may further comprise receiving a group join approval from an administrator account for the group message thread; and adding a group message thread index entry to a first position of an inbox index where the client device is not displaying the group message thread preview when the group join approval is received.

A computer-implemented method may further comprise determining that the user account has not been created for the messaging system; and initiating creation of the user account in response to determining that the user account has not been created for the messaging system and the group join command.

A computer-implemented method may further comprise receiving a user account creation confirmation for the user account from the messaging system; and adding the user account to the group message thread in response to the user account creation confirmation where the creation of the user account was initiated in response to the group join command.

A computer-implemented method may further comprise receiving a user account creation confirmation for the user account from the messaging system; instantiating a group join dialog for the group message thread in response to the user account creation confirmation where the creation of the user account was initiated in response to the group join command; and adding the user account to the group message thread in response to a group join dialog affirmation.

A computer-implemented method may further comprise the join invitation link received via a hyperlink or web control embedded in a web page, further comprising: displaying the group message thread embedded in the web page.

A computer-implemented method may further comprise wherein participation in the group message thread embedded in the web page is based on real-world names.

A computer-implemented method may further comprise displaying a spam control in association with the group message thread.

A computer-implemented method may further comprise detecting one or more group-thread user accounts participating in the group message thread; and suggesting the one or more group-thread user account as contacts for the user account with the messaging system.

A computer-implemented method may further comprise detecting one or more group-thread user accounts participating in the group message thread; and adding a shared-public-group-thread value to an association value between the user account and the one or more group-thread user accounts, wherein the shared-public-group-thread value is lower than a private-group-thread value for the messaging system.

An apparatus may comprise a processor circuit on a client device; a user interface component operative on the processor circuit to receive a join invitation link at a messaging client on the client device, the join invitation link comprising a thread invitation identifier, the thread invitation identifier identifying a group message thread on a messaging system; and receive a group join command at the messaging client; and a client messaging component operative on the processor circuit to add a user account to the group message thread with the messaging system in response to receiving the group join command by identifying the group message thread to the messaging system using the thread invitation identifier. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving a join invitation command associated with a group message thread from an administrator client device, the group message thread associated with a message thread identifier, the message thread identifier identifying the group message thread on a messaging system, the join invitation command requesting generation of a join invitation link for the group message thread;
generating a join invitation link in response to the join invitation command, the join invitation link comprising a thread invitation identifier, wherein the thread invitation identifier is a hash of the message thread identifier; and
sending the join invitation link to the administrator client device.

2. The method of claim 1, comprising:
storing the thread invitation identifier for the group message thread in an invitation link mapping table as associated with the message thread identifier;
receiving a join request from a requesting client device, the join request comprising the join invitation link, the join request associated with a joining user account with the messaging system,
extracting the thread invitation identifier from the join invitation link,
retrieving the message thread identifier for the group message thread from the invitation link mapping table based on the thread invitation identifier; and adding the joining user account to the group message thread with the messaging system.

3. The method of claim 2, further comprising:
receiving a join invitation refresh command associated with the group message thread;
generating a second join invitation link in response to the join invitation refresh command, the second join invitation link comprising a second thread invitation identifier, wherein the second thread invitation identifier is a second hash of the message thread identifier;
disassociating the thread invitation identifier for the group message thread from the message thread identifier in the invitation link mapping table;
storing the second thread invitation identifier for the group message thread in the invitation link mapping table as associated with the message thread identifier;
sending the second join invitation link to the administrator client device.

4. The method of claim 1, further comprising:
suggesting the group message thread to one or more users where the group message thread is publicly discoverable, wherein a display of the suggestion for the group message thread is associated with a suggestion-motivation tag, the suggestion-motivation tag associated with geographic location, topic, group membership, or friend membership in the group message thread.

5. The method of claim 1, the join invitation command specifying whether the group message thread requires administrator approval for joining.

6. The method of claim 1, further comprising:
suggesting one or more of group message thread creation and join invitation link creation to the administrator client device based on the administrator client device being used to share and/or display a content item, wherein the group message thread is associated with the content item.

7. The method of claim 1, the group message thread associated with a user group, the join invitation command specifying the group message thread as a user-group-only message thread, further comprising:
restricting access to the group message thread to the user group based on the join invitation command specifying the group message thread as the user-group-only message thread.

8. The method of claim 1, the join invitation command specifying the group message thread as publicly-viewable and as restricted-posting-only.

9. An apparatus, comprising:
a processor circuit on a device;
a client front-end component operative on the processor circuit to:
receive a join invitation command associated with a group message thread from an administrator client device, the group message thread associated with a message thread identifier, the message thread identifier identifying the group message thread on a messaging system, the join invitation command requesting generation of a join invitation link for the group message thread; and
send a join invitation link to the administrator client device; and
a group management component operative to generate the join invitation link in response to the join invitation command, the join invitation link comprising a thread invitation identifier, wherein the thread invitation identifier is a hash of the message thread identifier.

10. The apparatus of claim 9, further comprising,
the client front-end component operative to receive a join request from a requesting client device, the join request comprising the join invitation link, the join request associated with a joining user account with the messaging system; and
the group management component operative to store the thread invitation identifier for the group message thread in an invitation link mapping table as associated with the message thread identifier; extract the thread invitation identifier from the join invitation link; retrieve the message thread identifier for the group message thread from the invitation link mapping table based on the thread invitation identifier; and add the joining user account to the group message thread with the messaging system.

11. The apparatus of claim 10, further comprising:
the client front-end component operative to receive a join invitation refresh command associated with the group message thread; and send a second join invitation link to the administrator client device; and
the group management component operative to generate the second join invitation link in response to the join invitation refresh command, the second join invitation link comprising a second thread invitation identifier, wherein the second thread invitation identifier is a second hash of the message thread identifier; disassociate the thread invitation identifier for the group message thread from the message thread identifier in the invitation link mapping table; and store the second thread invitation identifier for the group message thread in the invitation link mapping table as associated with the message thread identifier.

12. The apparatus of claim 9, further comprising:
a contact recommendation component operative to suggest the group message thread to one or more users where the group message thread is publicly discoverable, wherein a display of the suggestion for the group message thread is associated with a suggestion-motivation tag, the suggestion-motivation tag associated with geographic location, topic, group membership, or friend membership in the group message thread.

13. The apparatus of claim 9, further comprising:
the group management component operative to suggest one or more of group message thread creation and join invitation link creation to the administrator client device based on the administrator client device being used to share and/or display a content item, wherein the group message thread is associated with the content item.

14. The apparatus of claim 9, the group message thread associated with a user group, the join invitation command specifying the group message thread as a user-group-only message thread, further comprising:
the group management component operative to restrict access to the group message thread to the user group based on the join invitation command specifying the group message thread as the user-group-only message thread.

15. At least one non-transitory computer-readable storage medium comprising instructions that, when executed, cause a system to:
receive a join invitation command associated with a group message thread from an administrator client device, the group message thread associated with a message thread identifier, the message thread identifier identifying the group message thread on a messaging system, the join invitation command requesting generation of a join invitation link for the group message thread;

generate a join invitation link in response to the join invitation command, the join invitation link comprising a thread invitation identifier, wherein the thread invitation identifier is a hash of the message thread identifier; and send the join invitation link to the administrator client device.

16. The computer-readable storage medium of claim 15, comprising further instructions that, when executed, cause a system to:

store the thread invitation identifier for the group message thread in an invitation link mapping table as associated with the message thread identifier;

receive a join request from a requesting client device, the join request comprising the join invitation link, the join request associated with a joining user account with the messaging system;

extract the thread invitation identifier from the join invitation link;

retrieve the message thread identifier for the group message thread from the invitation link mapping table based on the thread invitation identifier; and add the joining user account to the group message thread with the messaging system.

17. The computer-readable storage medium of claim 16, comprising further instructions that, when executed, cause a system to:

receive a join invitation refresh command associated with the group message thread;

generate a second join invitation link in response to the join invitation refresh command, the second join invitation link comprising a second thread invitation identifier, wherein the second thread invitation identifier is a second hash of the message thread identifier;

disassociate the thread invitation identifier for the group message thread from the message thread identifier in the invitation link mapping table;

store the second thread invitation identifier for the group message thread in the invitation link mapping table as associated with the message thread identifier;

send the second join invitation link to the administrator client device.

18. The computer-readable storage medium of claim 15, comprising further instructions that, when executed, cause a system to:

suggest the group message thread to one or more users where the group message thread is publicly discoverable, wherein a display of the suggestion for the group message thread is associated with a suggestion-motivation tag, the suggestion-motivation tag associated with geographic location, topic, group membership, or friend membership in the group message thread.

19. The computer-readable storage medium of claim 15, comprising further instructions that, when executed, cause a system to:

suggest one or more of group message thread creation and join invitation link creation to the administrator client device based on the administrator client device being used to share and/or display a content item, wherein the group message thread is associated with the content item.

20. The computer-readable storage medium of claim 15, the group message thread associated with a user group, the join invitation command specifying the group message thread as a user-group-only message thread, comprising further instructions that, when executed, cause a system to:

restrict access to the group message thread to the user group based on the join invitation command specifying the group message thread as the user-group-only message thread.

* * * * *